United States Patent
Hardacker et al.

(10) Patent No.: US 8,823,541 B2
(45) Date of Patent: Sep. 2, 2014

(54) BEZEL ILLUMINATION FOR DIGITAL DEVICES

(75) Inventors: Robert Hardacker, Escondido, CA (US); Steven Friedlander, San Diego, CA (US); Rafael Calderon, San Diego, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 728 days.

(21) Appl. No.: 12/582,401

(22) Filed: Oct. 20, 2009

(65) Prior Publication Data

US 2010/0289666 A1 Nov. 18, 2010

Related U.S. Application Data

(60) Provisional application No. 61/179,304, filed on May 18, 2009.

(51) Int. Cl.
*G08B 5/22* (2006.01)

(52) U.S. Cl.
USPC ............... 340/815.45; 340/565; 340/691.1; 340/691.6; 340/693.5

(58) Field of Classification Search
USPC ........... 340/815.45, 565, 691.1, 691.6, 693.5; 345/204, 104, 2.1, 901
See application file for complete search history.

(56) References Cited

U.S. PATENT DOCUMENTS

| | | | |
|---|---|---|---|
| 4,232,341 A | 11/1980 | Watanabe et al. | |
| 6,578,972 B1 | 6/2003 | Heirich et al. | |
| 6,975,308 B1 * | 12/2005 | Bitetto et al. | 345/204 |
| 7,209,187 B2 | 4/2007 | Mears et al. | |
| 7,493,177 B2 | 2/2009 | Ledbetter et al. | |
| 7,677,746 B2 | 3/2010 | Brown | |
| 7,907,841 B2 | 3/2011 | Aoyagi | |
| 7,969,505 B2 | 6/2011 | Saito | |
| 8,156,244 B2 | 4/2012 | Blair | |
| 2002/0018050 A1 | 2/2002 | Turner | |
| 2002/0171624 A1 | 11/2002 | Stecyk et al. | |
| 2002/0186325 A1 | 12/2002 | Mears et al. | |
| 2003/0002246 A1 | 1/2003 | Kerr | |
| 2003/0068165 A1 | 4/2003 | Hirai et al. | |
| 2004/0049962 A1 * | 3/2004 | Moshirnoroozi | 40/715 |

(Continued)

FOREIGN PATENT DOCUMENTS

| | | |
|---|---|---|
| EP | 1168288 | 1/2002 |
| JP | 8149387 | 6/1996 |

(Continued)

OTHER PUBLICATIONS

PCT search report in PCT/US2010/034700, which is the PCT counterpart to the present U.S. patent application.

(Continued)

*Primary Examiner* — Daryl Pope
(74) *Attorney, Agent, or Firm* — John L. Rogitz

(57) ABSTRACT

First, a user may select an illumination color for a bezel framing a display of an electronics device. Second, the illumination of a digital picture frame may be established based on sensed motion nearby and/or ambient light. Third, the color of a user interface presented on a display can be established to match the color of the room in which the display is disposed, as indicated by colorimetry from a camera.

18 Claims, 1 Drawing Sheet

(56) References Cited

U.S. PATENT DOCUMENTS

| | | |
|---|---|---|
| 2004/0149892 A1 | 8/2004 | Akitt et al. |
| 2004/0156192 A1 | 8/2004 | Kerr et al. |
| 2004/0204226 A1 | 10/2004 | Foster et al. |
| 2006/0209527 A1 | 9/2006 | Shin |
| 2006/0266763 A1 | 11/2006 | Svabo Bech |
| 2007/0081643 A1* | 4/2007 | Divine .................... 379/100.01 |
| 2008/0204359 A1* | 8/2008 | Tsui et al. ..................... 345/5 |
| 2008/0267449 A1 | 10/2008 | Dumas et al. |
| 2008/0294017 A1 | 11/2008 | Gobeyn et al. |
| 2009/0019752 A1* | 1/2009 | Liao ............................. 40/714 |
| 2009/0021587 A1 | 1/2009 | Snyderman et al. |
| 2009/0051779 A1 | 2/2009 | Rolston |
| 2009/0185723 A1* | 7/2009 | Kurtz et al. .................. 382/118 |
| 2009/0289874 A1 | 11/2009 | Ha |
| 2010/0026707 A1 | 2/2010 | Hoogenstraaten et al. |
| 2010/0052548 A1 | 3/2010 | Allard et al. |
| 2010/0053229 A1 | 3/2010 | Krijn et al. |
| 2010/0201539 A1 | 8/2010 | Kerr et al. |
| 2010/0238664 A1 | 9/2010 | Steenbergen et al. |
| 2010/0259828 A1 | 10/2010 | Byeon et al. |
| 2010/0259829 A1 | 10/2010 | Kim et al. |
| 2010/0309369 A1 | 12/2010 | Jarvis et al. |
| 2011/0018462 A1 | 1/2011 | Lowe et al. |
| 2011/0018849 A1 | 1/2011 | Lowe et al. |
| 2011/0051019 A1 | 3/2011 | Hardacker et al. |
| 2011/0128719 A1 | 6/2011 | Tracy et al. |
| 2011/0188240 A1 | 8/2011 | Simon et al. |
| 2011/0316807 A1 | 12/2011 | Corrion |

FOREIGN PATENT DOCUMENTS

| | | |
|---|---|---|
| JP | 11-289502 | 10/1999 |
| JP | 2006025167 | 1/2006 |
| JP | 2007194625 | 8/2007 |
| KR | 20-1999-0009217 | 3/1999 |
| KR | 20010094205 | 10/2001 |
| KR | 10-2002-0085813 | 11/2002 |
| KR | 20050023209 | 3/2005 |
| KR | 10-2006-0086685 | 8/2006 |
| KR | 10-0833616 | 5/2008 |
| WO | 2008065614 | 6/2008 |

OTHER PUBLICATIONS

PCT search report in PCT/US2010/034687, the PCT counterpart to the U.S. Appl. No. 12/582,401, which is directed to subject matter related to the present U.S. patent application.

Robert Hardacker et al., "Active Bezel Edge Lighting with Diffuser Layer", file history of co-pending U.S. Appl. No. 12/582,188, filed Oct. 20, 2009 (1168.398).

Robert Hardacker et al. "Bezel Color Coordination" file history of co-pending U.S. Appl. No. 12/582,274, filed Oct. 20, 2009 (1168.410).

Robert Hardacker, et al "Feedback System for Optimizing Exposure" file history of co-pending U.S. Appl. No. 12/556,084, filed Sep. 9, 2009 (1168.409).

Robert Hardacker, Rafael Calderon, Steven Richman, "Feedback System for Optimizing Exposure" related U.S. Appl. No. 12/556,084, final office action dated Nov. 26, 2012.

Robert Hardacker, Rafel Calderon, Steven Richman, "Active Bezel Edge Lighting with Diffuser Layer", Jun. 7, 2012 non-final office action from related pending U.S. Appl. No. 12/582,188, filed Oct. 20, 2009.

Robert Hardacker, Rafel Calderon, Steven Richman, "Active Bezel Edge Lighting with Diffuser Layer", Applicants response filed Jun. 11, 2012 to non-final office action dated Jun. 7, 2012 from related pending U.S. Appl. No. 12/582,188, filed Oct. 20, 2009.

Robert Hardacker, Rafael Calderon, Steven Richman, "Active Bezel Edge Lighting with Diffuser Layer" related U.S. Appl. No. 12/582,188, non-final office action dated Apr. 11, 2013.

Robert Hardacker, Rafael Calderon, Steven Richman, "Active Bezel Edge Lighting with Diffuser Layer" related U.S. Appl. No. 12/582,188, amendment in response to non-final office action filed Apr. 25, 2013.

Robert Hardacker, Rafael Calderon, Steven Richman, "Feedback System for Optimizing Exposure" related U.S. Appl. No. 12/556,084, non-final office action dated Feb. 28, 2013.

Robert Hardacker, Rafael Calderon, Steven Richman, "Feedback System for Optimizing Exposure" related U.S. Appl. No. 12/556,084, amendment in response to non-final office action filed Mar. 4, 2013.

Robert Hardacker, Rafael Calderon, Steven Richman, "Bezel Color Coordination" related U.S. Appl. No. 13/189,906, final office action dated Apr. 3, 2013.

Robert Hardacker, Rafael Calderon, Steven Richman, "Bezel Color Coordination" related U.S. Appl. No. 13/189,906, amendment in response to final office action filed Apr. 10, 2013.

Robert Hardacker, Rfael Calderon, Steven Richman, "Active Bezel Edge Lighting with Diffuser Layer", related U.S. Appl. No. 12/582,188, final office action dated Oct. 16, 2012.

Robert Hardacker, Rafael Calderon, Steven Richman, "Feedback System for Optimizing Exposure" related U.S. Appl. No. 12/556,084 final office action dated Mar. 6, 2014.

* cited by examiner example motion logic user/interface for user selections example ambient light logic alternate embodiment logic

BEZEL ILLUMINATION FOR DIGITAL DEVICES

This application claims priority to U.S. provisional application Ser. No. 61/179,304, filed May 18, 2009.

FIELD OF THE INVENTION

The present invention relates a feedback system implemented into a display device involving a mounted light source whose brightness is controlled by a mounted camera sending information to a processor within the display device.

BACKGROUND OF THE INVENTION

Digital photo frames have been provided which can present, on a computer-controlled display, digital photographs. These frames mimic in size and shape traditional photo frames, but have the advantages of allowing users to rapidly view multiple photos in succession without flipping through a hard copy album, and allowing users to quickly and easily change the image that is presented in the frame without having to remove the back of the frame and swap hard copy photos.

As understood herein, enhancements can be provided to the bezel framing the digital photo display. Moreover, present principles understand that in general, the illumination of bezels in consumer electronics devices may be improved for visual appeal and effect.

SUMMARY OF THE INVENTION

In one embodiment, a digital photo frame assembly includes a frame, a display bordered by the frame, and one or more light sources such as LEDs are positioned to internally illuminate the frame. A computer readable storage medium bearing digital still images is provided, and a processor causes images from the medium to be presented on the display. The processor establishes an illumination of the frame based on a motion signal and/or an ambient light signal received by the processor.

In some implementations the assembly can include a motion sensor communicating with the processor and sending a motion signal to the processor in response to motion of an object relative to the assembly. The processor establishes the illumination of the frame in response to the motion signal. In addition or alternatively, the assembly can include a light sensor communicating with the processor and sending an ambient light signal to the processor representative of a level of ambient light external to the assembly, with the processor establishing the illumination of the frame in response to the ambient light signal. The processor may incrementally control the illumination from lighter to darker along a continuum based on the amount of ambient light.

In another embodiment, an electronic apparatus has a video display, a camera positioned to image a space in front of the display, and a processor receiving signals from the camera and responsive thereto establishing a color of a user interface presented on the display, and/or a color of a bezel framing the display. The processor may use colorimetry information from the camera to establish the color.

In another aspect, an electronic apparatus includes a video display, a bezel framing the display, and plural light sources positioned to internally illuminate the bezel. A first light source is characterized by a first color and a second light source is characterized by a second color. A processor communicates with the light sources, and the processor energizes the first light source but not the second light source in response to a first user-input bezel color selection signal representing the first color. When a second user input specifying the second color is received, the processor energizes the second light source but not the first light source. In effect, a user is given the opportunity to select the color with which a bezel of, e.g., a TV or other electronic device is internally illuminated.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
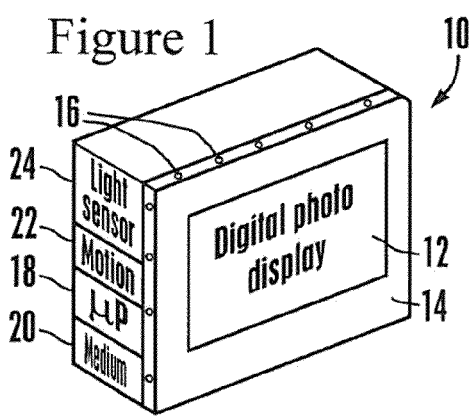
FIG. 1 is a perspective view of a digital picture frame, showing interior components systematically.

Referring initially to FIG. 1, a digital photo frame assembly 10 includes a display 12 and bezel 14 framing the display 12. The display 12 may be an LCD display or any other mode of display screen, and it may be a touch screen display. The bezel 14 may be comprised of plastic; however it is not limited to a plastic medium.

Plural light sources 16 such as light emitting diodes (LED) may be disposed inside the bezel 14 as shown to illuminate it in accordance with principles discussed below under control of a processor 18. The processor 18 accesses a computer readable medium 20 such as solid state or disk-based storage and bearing digital photographs and software code executable by the processor 18. Under control of user input from an input device such as, e.g., the touch screen display, the processor can present a still digital image from the storage medium 20 on the display 12.

A motion sensor 22 and/or an ambient light sensor 24 may also be provided in the assembly 10 and may communicate with the processor 20. The motion sensor 22 generates signals representative of the motion of objects such as humans in front of the assembly 10. The ambient light sensor 24 generates signals representative of the level of ambient light in the space in which the assembly 10 is disposed.

Figure 2:
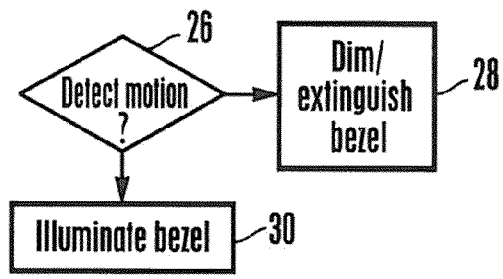
FIG. 2 is a flow chart of example logic for bezel illumination based on motion.

FIG. 2 shows how the illumination of the bezel 14 may be established in response to motion in the room in which the assembly 10 is disposed. If motion above a threshold is detected at decision diamond 26, the processor at block 28 may dim the illumination provided by the light sources 16 by, e.g., reducing the voltage sent to the light sources 16. Or, the processor may extinguish illumination of the bezel altogether when motion is sensed by deenergizing the light sources 16.

On the other hand, when no motion above the threshold has been sensed, e.g., for longer than a threshold period, the logic may move to block 30 to illuminate the bezel by energizing deenergized light sources 16 or by increasing the voltage to those light sources 16 that are already energized.

It is to be understood that the opposite logic may be used, i.e., when motion not is sensed the illumination of the bezel may be reduced or terminated and when motion is sensed the bezel may be illuminated. In other words, the "yes" and "no" branches from decision diamond 26 in FIG. 2 may be reversed in alternate embodiments.

Figure 3:
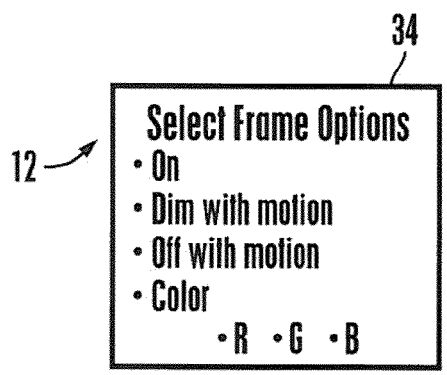
FIG. 3 is a screen shot of a user interface for enabling a user to select bezel illumination options.

Additionally, if desired the user may be given the option of selecting illumination features. FIG. 3 shows a user interface 34 that the processor 18 may cause to be presented on the display 12, in which the user can command the processor to, e.g., dim the light sources 16 when motion is sensed, turn the light sources on when motion is sensed, or turn the light sources off when motion is sensed. Furthermore, when, for example, the light sources 16 are composed of color LEDs of differing colors (e.g., red, green, and blue), the user may be given the option of selecting the desired color of illumination of the bezel. In response, if the user selects "red", only red light sources 16 are energized during the logic of FIG. 2. It is to be understood that the user interface of FIG. 3 may be used in any of the embodiments discussed herein the permit a user to define the color of the light used to illuminate the various bezels.

Figure 4:
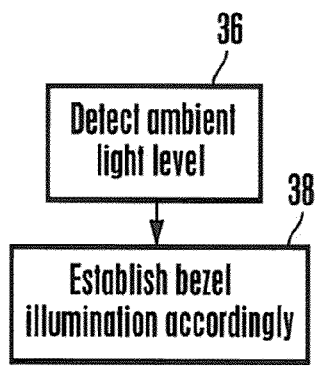
FIG. 4 is a flow chart of example logic for bezel illumination based on ambient light level.

In addition to or in lieu of using motion to establish bezel illumination, ambient light levels surrounding the assembly 10 as sensed by the light sensor 24 may be used. Turning to FIG. 4, ambient light level is detected by the light sensor 24 at block 36 and sent to the processor 18. In response to the ambient light level, at block 38 the processor 18 establishes the illumination of the bezel 14 accordingly. For example, brighter ambient light can result in increased voltage being sent to the light sources 16, whereas dimmer ambient light can result in decreased voltage being sent to the light sources 16. Or, the opposite paradigm may be used, e.g., brighter ambient light can result in decreased voltage being sent to the light sources 16, whereas dimmer ambient light can result in increased voltage being sent to the light sources 16.

It is to be understood that the processor 18 may gradually (over the interval of several seconds) brighten illumination, i.e., may gradually increase the voltage to the light sources 16, when it determines based on either motion or ambient that bezel illumination should be increased, to avoid sudden brightness being inflicted on a viewer who might have just awakened.

Figure 5:
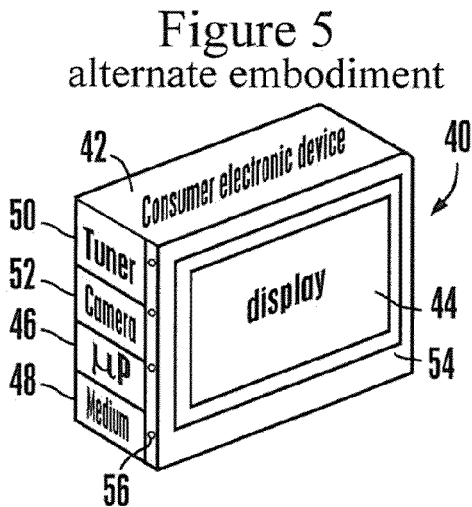
FIG. 5 is a perspective view of an electronics device, showing interior components systematically.

FIG. 5 shows an alternate embodiment. A consumer electronics (CE) device 40 includes a housing 42 holding a video display 44 such as a flat panel display. A processor 46 is in the housing 42 and accesses a computer readable medium 48 to execute logic below. The CE device 40 may be, without limitation, a digital camera, camcorder, telephone, personal digital assistant (PDA), or TV, in which latter case the device 40 typically includes a TV tuner 50.

A camera 52 is supported in or on the housing 42 as shown. The camera 52 sends signals to the processor 46, which derives colorimetry information therefrom. Thus, the camera 52 can be positioned to image the room or space in which the device 40 is disposed, with the processor 46 using signals from the camera to determine colors/hues in the room or space.

As also shown, a bezel 54, which, like the other bezels herein, may be transparent or translucent, frames the display 44. Light sources 56 are disposed in or behind the bezel 54 and are energized under control of the processor 46 to internally illuminate the bezel 54. The light sources 56 can be LEDs of various colors.

Figure 6:
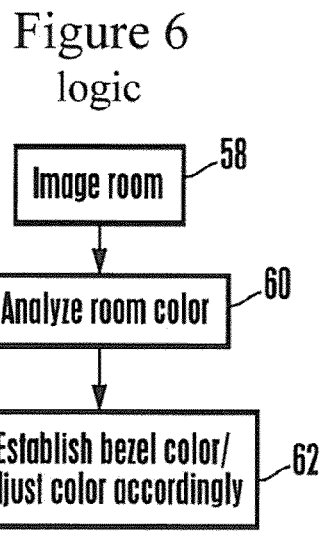
FIG. 6 is a flow chart of example logic for establishing bezel illumination color to match room color based on colorimetry from a camera.

With this in mind, the logic of FIG. 6 may now be appreciated. The camera 52 images the space or room in which the device 40 is disposed at block 58 and sends a signal representative thereof to the processor 48, which analyzes the image signal for color at block 60. At block 62 the processor 46 establishes, by energizing the appropriately colored light sources 56, the color of the illumination of the bezel 54. Alternatively to a camera image, the processor may analyze the colors in an image downloaded into the device 40 using, e.g., a removable memory medium.

In any case, the processor 46 may use heurisitics or a table lookup or other appropriate method to establish bezel illumination color based on an image color. As an example, the processor may establish the bezel illumination to be the same color as the predominant color, in terms of number of pixels for instance, in the image. Or, the processor may establish bezel illumination color to be a predetermined different color from the predominant image color, e.g., the processor may cause only blue light sources to be energized when the predominant color of the room is green. Yet again, the processor can execute a table lookup of bezel illumination color versus primary and secondary image colors. Or, the processor may simply present a color palette on the display showing the imaged color(s) and permit the user to select from the palette the color to be used in illuminating the bezel.

While the particular BEZEL ILLUMINATION FOR DIGITAL DEVICES is herein shown and described in detail, it is to be understood that the subject matter which is encompassed by the present invention is limited only by the claims.

What is claimed is:

1. Digital photo frame assembly comprising:
   frame;
   display bordered by the frame;
   at least one light source positioned to internally illuminate the frame;
   computer readable storage medium bearing digital still images; and
   processor causing at least one image from the medium to be presented on the display, the processor establishing an illumination of the frame based at least in part on:
   colorimetry information from a camera on the assembly positioned to image a space in front of the display to establish the illumination; and/or
   signals from the camera to establish the illumination.

2. The assembly of claim 1, wherein the frame is established by a bezel.

3. The assembly of claim 2, wherein the light source includes plural light emitting diodes (LED) juxtaposed with the bezel.

4. The assembly of claim 1, comprising a motion sensor communicating with the processor and sending a motion signal to the processor in response to motion of an object relative to the assembly, the processor further establishing the illumination of the frame in response to the motion signal.

5. The assembly of claim 1, comprising a light sensor communicating with the processor and sending an ambient light signal to the processor representative of a level of ambient light external to the assembly, the processor further establishing the illumination of the frame in response to the ambient light signal.

6. The assembly of claim 1, wherein the processor establishes at least three different illuminations of the frame in response to, respectively, three different signals received from the camera.

7. An electronic apparatus, comprising:
a video display;
a camera positioned to image a space in front of the display; and
a processor receiving signals from the camera and responsive thereto establishing a color of a user interface presented on the display, and/or a color of a bezel framing the display;
wherein the processor uses colorimetry information from the camera to establish the color of the user interface and/or bezel.

8. The apparatus of claim 7, wherein the apparatus includes a TV tuner.

9. The apparatus of claim 7, wherein the camera is mounted on a housing of the apparatus.

10. An electronic apparatus, comprising:
a video display;
a camera positioned to image a space in front of the display; and
a processor receiving signals from the camera and responsive thereto establishing a color of a user interface presented on the display;
wherein the processor establishes the color of the user interface in response to the signals from the camera.

11. An electronic apparatus, comprising;
a video display;
a camera positioned to image a space in front of the display; and
a processor receiving signals from the camera and responsive thereto establishing a color of a bezel framing the display;
wherein the processor establishes the color of the bezel framing the display in response to the signals from the camera.

12. An electronic apparatus, comprising:
a video display;
a bezel framing the display;
plural light sources positioned to internally illuminate the bezel, at least a first light source being characterized by a first color and a second light source being characterized by a second color; and
a processor communicating with the light sources, the processor energizing the first light source but not the second light source in response to a first user-input bezel color selection signal representing the first color, the processor energizing the second light source but not the first light source in response to a second user-input bezel color selection signal representing the second color.

13. The apparatus of claim 12, comprising a TV tuner communicating with the processor.

14. The apparatus of claim 12, wherein the apparatus is embodied in a video camera.

15. The apparatus of claim 12, wherein the apparatus is embodied in a camcorder.

16. The apparatus of claim 12, wherein the apparatus is embodied in a telephone.

17. The apparatus of claim 12, wherein the apparatus is embodied in a personal digital assistant (PDA).

18. The apparatus of claim 12, wherein the light sources are light emitting diodes (LED) positioned inside the bezel.

* * * * *